(12) United States Patent
Lu et al.

(10) Patent No.: US 8,997,224 B1
(45) Date of Patent: Mar. 31, 2015

(54) EXPLOSIVE NETWORK ATTACK AND MITIGATION STRATEGIES

(71) Applicant: HRL Laboratories, LLC, Malibu, CA (US)

(72) Inventors: Tsai-Ching Lu, Wynnewood, PA (US); Hankyu Moon, Oak Park, CA (US); David L. Allen, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 79 days.

(21) Appl. No.: 13/935,460

(22) Filed: Jul. 3, 2013

Related U.S. Application Data

(60) Provisional application No. 61/784,583, filed on Mar. 14, 2013.

(51) Int. Cl.
*G06F 12/14* (2006.01)
*H04L 29/06* (2006.01)

(52) U.S. Cl.
CPC .................... *H04L 63/1441* (2013.01)
USPC ............................................. 726/22; 726/23

(58) Field of Classification Search
CPC ............ H04L 63/1441; H04L 63/1408; H04L 63/1433
USPC ..................................................... 726/22, 23
See application file for complete search history.

(56) References Cited

U.S. PATENT DOCUMENTS

| | | | |
|---|---|---|---|
| 8,225,402 B1 * | 7/2012 | Averbuch et al. ................ | 726/23 |
| 8,832,839 B2 * | 9/2014 | Avritzer ........................... | 726/25 |
| 2007/0118896 A1 * | 5/2007 | Soejima et al. .................. | 726/22 |
| 2008/0295175 A1 * | 11/2008 | Ansari et al. .................... | 726/23 |
| 2012/0090028 A1 * | 4/2012 | Lapsley et al. .................. | 726/22 |
| 2013/0152214 A1 * | 6/2013 | Jackson et al. .................. | 726/26 |
| 2013/0263256 A1 * | 10/2013 | Dickinson et al. .............. | 726/22 |

OTHER PUBLICATIONS

Porras et al, "A Hybrid Quarantine Defense", Oct. 29, 2004, ACM, pp. 73-82.*
Hegedus et al., "Methodology for Behavioral-based Malware Analysis and Detection using Random Projections and K-Nearest Neighbors Classifiers", 2011, IEEE, pp. 1016-1023.*
D. Achlioptas, R. M. D'Souza, and J. Spencer, Explosive Percolation in Random Networks, Science, 330:5920, 2009.
R. Albert, H. Jeong & A-L Barabási, Error and Attack Tolerance of Complex Networks, Nature, 406,378-382, 2000.
N. A. M. Araujo and H.J. Herrmann, Explosive Percolation via Control of the Largest Clustar, Phys. Rev. Lett., 105:035701, 2010.

(Continued)

*Primary Examiner* — Matthew Smithers
(74) *Attorney, Agent, or Firm* — Tope-McKay & Associates

(57) ABSTRACT

Described is a system for explosive network attack and mitigation analysis. A network structure is received as input. A network attack method that applies an Achlioptas process is selected. Then, an explosive mitigation strategy is selected. An attack-mitigation competing process is simulated for the network structure. A sequence of network structures under competing processes is generated. The effectiveness of the selected explosive mitigation strategy against the selected network attack method is quantified by analyzing the sequence of network structures under competing processes.

12 Claims, 16 Drawing Sheets

(56) References Cited

OTHER PUBLICATIONS

N. A. M. Araújo, J. S. Andrade, Jr., R. M. Ziff, and H. J. Herrmann1, Tricritical Point in Explosive Percolation, Phys. Rev. Lett., 106, 095703, 2011.

N. Bastas, K. Kosmidis, and P. Argyrakis, Explosive Site Percolation and Finite-Size Hysteresis, Phys. Rev. E 84, 066112, 2011.

S-V Buldyrev, R Parshani, G Paul, H-E Stanley, and S Havlin, Catastrophic Cascade of Failures Interdependent Networks, Nature 464:1025-1028, 2010.

D. S. Callaway, M. E. J. Newman, S. H. Strogatz, D. J. Watts, Network Robustness and Fragility: Percolation on Random Graphs, Phys. Rev Lett. 85:5468-5471, 2000.

W. Chen, and R. M. D'Souza, Explosive Percolation with Multiple Giant Components, Phys. Rev. Lett. 106, 115701, 2011.

Y. S. Cho, J. S. Kim, J. Park, B. Kahng, and D. Kim Percolation Transitions in Scale-Free Networks under the Achlioptas Process, Phys. Rev. Lett. 103:135702, 2009.

Y.S. Cho, B. Kahng, and D. Kim, Cluster Aggregation Model for Discontinuous Percolation Transition, Phys. Rev. E., 030103:R., 2010.

R. M. D'Souza and M. Mitzenmacher, Local Cluster Aggregation Models of Explosive Percolation, Phys. Rev. Lett., 104:195702, 2010.

P. Erdös and A. Rényl, On the Evolution of Random Graphs, Publ. Math. Inst. Hungar. Acad. Sci., 5:17, 1960.

E. J. Friedman, and A. S. Landsberg, Construction and Analysis of Random Networks with Explosive Percolation, Phys. Rev. Let., 103:255701, 2009.

H. Hooyberghs and B. V. Schaeybroeck, Criterion for Explosive Percolation Transitions on Complex Networks, Phys. Rev. E, 63, 032101, 2011.

J. Nagler, A. Levina and M. Timme, Impact of Single Links in Competitive Percolation, Nature Physics, 7, 265, 2011.

R. K. Pan, M. Kivela, J. Saramaki, K. Kaski, and J. Kertész, Using Explosive Percolation in Analysis of Real-World Networks, Phys. Rev. E, 83, 046112, 2011.

F. Radicchi and S. Fortunato, Explosive Percolation in Scale-Free Networks, Phys. Rev. Lett. 103:168701, 2009.

O. Riordan and L. Warnke, Explosive Percolation is Continuous, Science, 333:6040, 2011.

H.D. Rozenfeld, L.K. Gallos, and H.A. Makse, Explosive Percolation in the Liman Protein Homology Network, Eur. Phys. J. B, 75, 305-310, 2010.

C. M. Schneider, A. A. Moreira, S. Andrade, Jr., S. Havlin, and H. J. Herrmann, Mitigation of Malicious Attacks on Networks, PNAS, 2011.

R. Ziff, Explosive Growth in Biased Dynamic Percolation on 2-D Regular Lattice Networks, Phys. Rev. Lett. 103:045701, 2009.

da Costa, R, A. and Dorogovtsev, S. N. and Goltsev A. V. and Mendes, J. F. F., Explosive Percolation Transition is Actually Continuous, Phys. Rev. Lett., 105, 255701, 2010.

\* cited by examiner

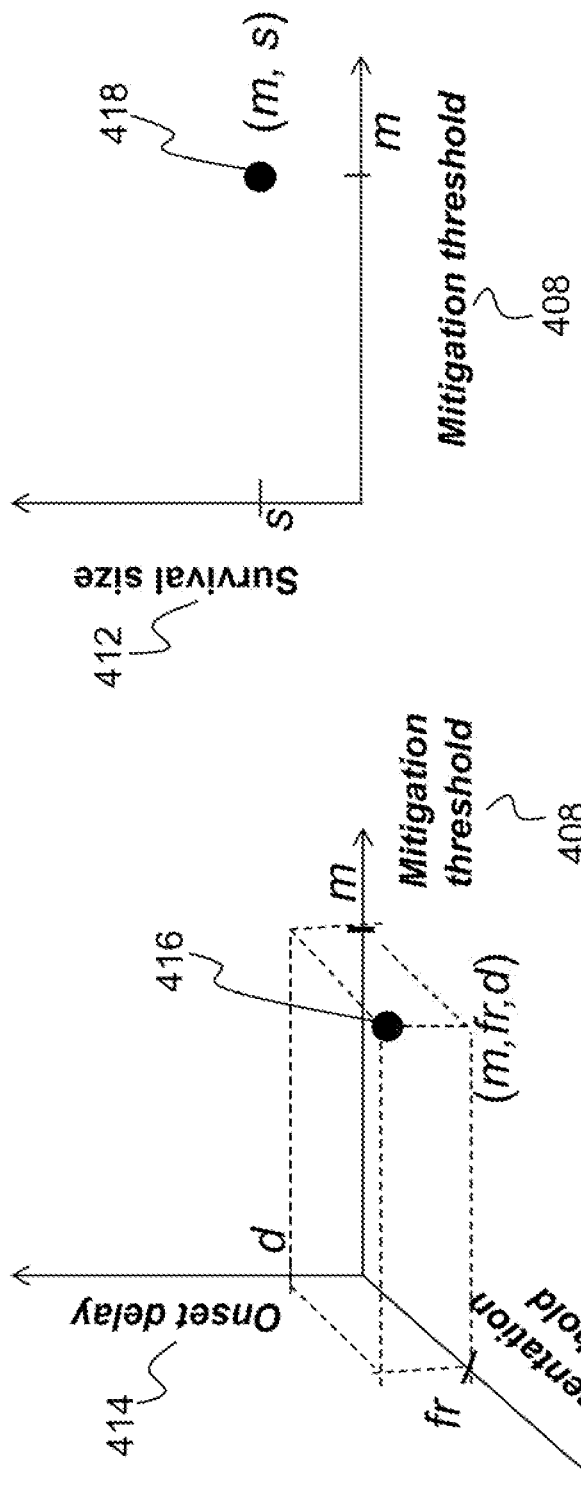

EXPLOSIVE NETWORK ATTACK AND MITIGATION STRATEGIES

CROSS-REFERENCE TO RELATED APPLICATIONS

This is a Non-Provisional patent application of U.S. Provisional Application No. 61/784,583, filed in the United States on Mar. 14, 2013, entitled, "Explosive Network Attack and Mitigation Strategies."

BACKGROUND OF THE INVENTION (1) Field of Invention

The present invention relates to a system for explosive network attack and mitigation strategies and, more particularly, to a system for explosive network attack and mitigation strategies based on Achlioptas processes.

(2) Description of Related Art

Achlioptas et al. (see the List of Cited Literature References, Literature Reference No. 1) first reported the finding of explosive percolation, where the size of a giant component goes through the first-order phase transition in so called Achlioptas processes. This finding advanced the common belief that the phase transition of a giant component in random network formation is a second-order phenomenon, as demonstrated in the pioneering Erdös-Rényi random graph model (see Literature Reference No. 6). The work of Achlioptas et al. (see Literature Reference No. 1) initiated the interest of the community to actively develop different mechanisms in generating discontinuous phase transitions (see Literature Reference Nos. 3, 4, 5, 8, 9, 10, 11, 13, 14, 17, and 21), as well as develop mathematically rigorous proof about the "discontinuous" phase transition generated by Achlioptas processes (see Literature Reference No. 18). Achlioptas process was later mathematically proven by Literature Reference No. 18 as having continuous transitions when the number of nodes approaches infinity, but having a "weakly" discontinuous property where the simulations up to a $10^{18}$-node network so far still show discontinuous phase transitions. Others have used Achlioptas processes to model observed real-world datasets (see Literature Reference Nos. 16 and 19).

Albert et al. (see Literature Reference No. 2) initiated the investigation of system robustness and scale-free complex networks. The major finding was that complex systems with scale-free structures are more resilient to random failures, but fragile to targeted attacks on hub nodes. Literature Reference No. 7 developed theoretical percolation models to characterize network robustness for a wide variety of networks with general degree distributions. The works of Albert et al. (see Literature Reference No. 2) have been applied to the quantification of system robustness for networks including power grids, airlines, Internet, protein-protein interaction networks, neural networks, and many other complex systems.

The most notable recent work includes the demonstration of discontinuous phase transitions of cascading failures between two inter-dependent networks (see Literature Reference No. 6), and the development of a new robustness measure to guide the rewiring of the network to improve system robustness before the attack (see Literature Reference No. 20). Prior works based on Literature Reference Nos. 2 and 7 primarily focused on the quantification of network robustness for a given static network structure without mitigation. The concept of treating mitigation as a competition process amid network attacks or failures is foreign to the community.

Each of the prior methods described above exhibit limitations that make them incomplete. Thus, a continuing need exists for a system that utilizes Achlioptas processes as explosive attack and mitigation strategies to analyze the resilience of complex networks and the effectiveness of mitigations against attacks or failures.

SUMMARY OF THE INVENTION

The present invention relates to a system for explosive network attack and mitigation strategies and, more particularly, to a system for explosive network attack and mitigation strategies based on Achlioptas processes. The system comprises one or more processors and a memory having instructions such that when the instructions are executed, the one or more processors perform multiple operations. A network structure is received as input, and a network attack method that applies an Achlioptas process is selected. An explosive mitigation strategy is also selected. An attack-mitigation competing process is simulated for the network structure. A sequence of network structures under competing processes is generated, and effectiveness of the selected explosive mitigation strategy against the selected network attack method is quantified by analyzing the sequence of network structures under competing processes.

In another aspect, effectiveness of the selected mitigation strategy is quantified based on at least one measure that evaluates a change in size of a giant component in the sequence of network structures under competing processes.

In another aspect, the at least one measure is a survival size measure that evaluates final sizes of the giant component following the attack-mitigation competing process.

In another aspect, the at least one measure is an onset delay measure that evaluates a pre-defined fragmentation threshold of the size of the giant component.

As can be appreciated by one skilled in the art, the present invention also comprises a method for causing a processor to perform the operations described herein.

Finally, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4B illustrates the onset delay of fragmentation in FIG. 4A with respect to mitigation threshold and fragmentation threshold according to principles of the present invention;

FIG. 4C illustrates the survival size in FIG. 4A with respect to mitigation threshold according to principles of the present invention;

DETAILED DESCRIPTION

Figure 1:
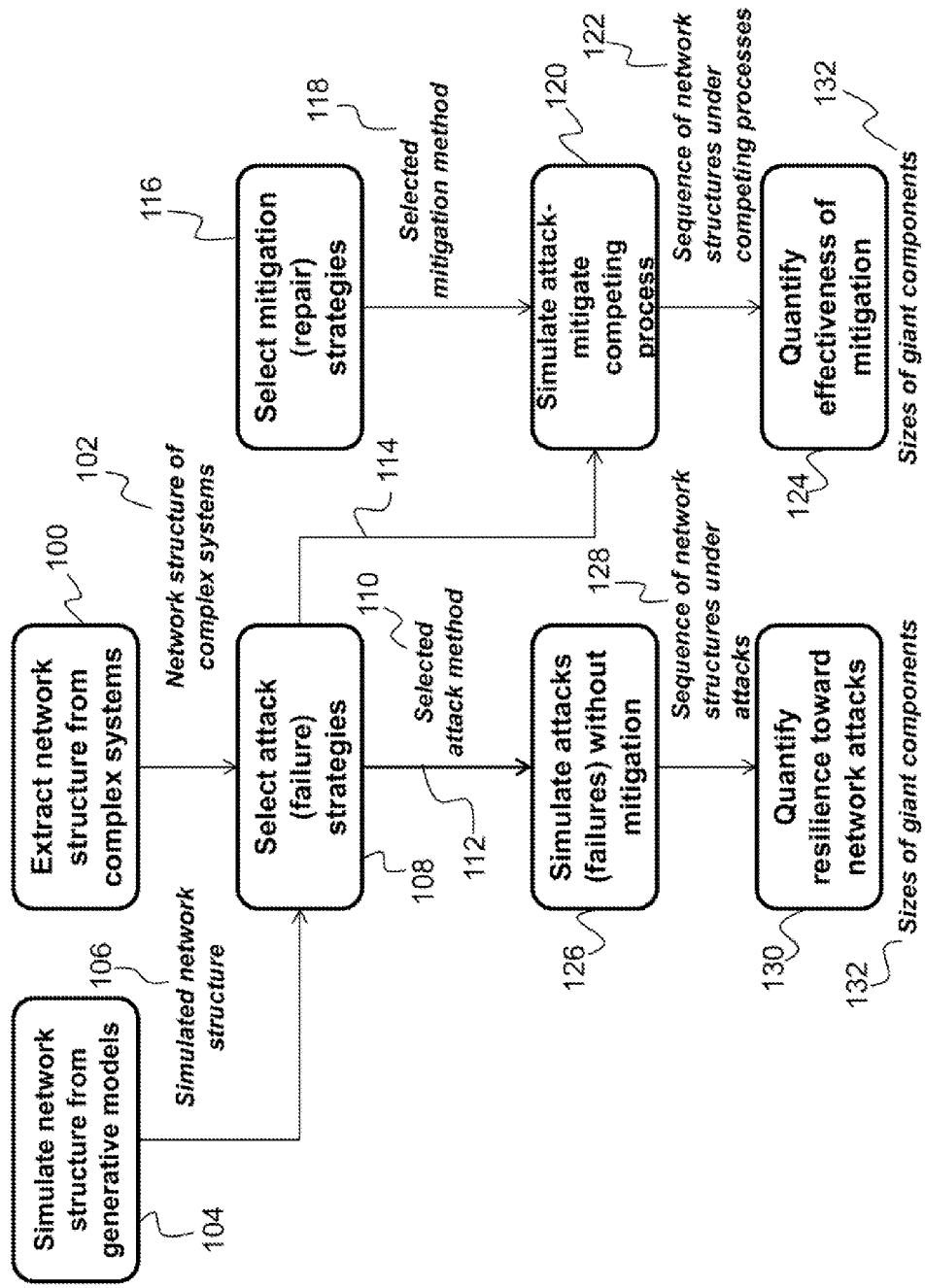
FIG. 1 is a flow diagram of the network attack and mitigation strategy analysis (NAMSA) system according to principles of the present invention.

The present invention relates to a system for explosive network attack and mitigation strategies and, more particularly, to a system for explosive network attack and mitigation strategies based on Achlioptas processes. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. D. Achlioptas, R. M. D'Souza, and J. Spencer, Explosive Percolation in Random Networks, *Science,* 330:5920, 2009.
2. R. Albert, H. Jeong & A-L Barabasi, Error and Attack Tolerance of Complex Networks, Nature, 406,378-382, 2000.
3. N. A. M. Araájo and H. J. Herrmann, Explosive Percolation via Control of the Largest Cluster, *Phys. Rev. Letl.,* 105: 035701, 2010.
4. N. A. M. Araijo, J. S. Andrade, Jr., R. M. Ziff, and H. J. Herrmannl, Tricritical Point in Explosive Percolation, *Phys. Rev. Lett.,* 106, 095703, 2011.

5. N. Bastas, K. Kosmidis, and P. Argyrakis, Explosive Site Percolation and Finite-Size Hysteresis, *Phys. Rev. E* 84, 066112, 2011.
6. S-V Buldyrev, R Parshani, G Paul, H-E Stanley, and S Havlin, Catastrophic Cascade of Failures in Interdependent Networks, *Nature* 464:1025-1028, 2010.
7. D. S. Callaway, M. E. J. Newman, S. H. Strogatz, D. J. Watts, Network Robustness and Fragility: Percolation on Random Graphs, Phys. Rev. Lett. 85:5468-5471, 2000.
8. W. Chen, and R. M. D'Souza, Explosive Percolation with Multiple Giant Components, *Phys. Rev. Lett.* 106, 115701, 2011.
9. Y. S. Cho, J. S. Kim, J. Park, B. Kahng, and D. Kim, Percolation Transitions in Scale-Free Networks under the Achlioptas Process, *Phys. Rev. Lett.* 103:135702, 2009.
10. Y. S. Cho, B. Kahng, and D. Kim, Cluster Aggregation Model for Discontinuous Percolation Transition, *Phys. Rev. F,* 030103:R., 2010.
11. R. M. D'Souza and M. Mitzenmacher, Local Cluster Aggregation Models of Explosive Percolation, *Phys. Rev. Let.,* 104:195702, 2010.
12. P. Erdös and A. Rényi. On the Evolution of Random Graphs, *Publ. Math. Inst. Hungar. Acad. Sci.,* 5:17, 1960.
13. E. J. Friedman, and A. S. Landsberg, Construction and Analysis of Random Networks with Explosive Percolation, *Phys. Rev. Let.,* 103:255701, 2009.
14. H. Hooyberghs and B. V. Schaeybroeck, Criterion for Explosive Percolation Transitions on Complex Networks, *Phys. Rev. E,* 83, 032101, 2011.
15. J. Nagler, A. Levina and M. Timme, Impact of Single Links in Competitive Percolation, *Nature Physics,* 7, 265, 2011.
16. R. K. Pan, M. Kivels, J. Saramaki, K. Kaski, and J. Kertsz, Using Explosive Percolation in Analysis of Real-World Networks, *Phys. Rev. E,* 83, 046112, 2011.
17. F. Radicchi and S. Fortunato, Explosive Percolation in Scale-Free Networks, *Phys. Rev. Leut.* 103:168701, 2009.
18. O. Riordan and L. Warnke, Explosive Percolation is Continuous, *Science,* 333:6040, 2011.
19. H. D. Rozenfeld, L. K. Gallos, and H. A. Makse, Explosive Percolation in the Human Protein Homology Network, *Eur. Phys. J. B,* 75, 305-310, 2010.
20. C. M. Schneider, A. A. Moreira, J. S. Andrade, Jr., S. Havlin, and H. J. Herrmann, Mitigation of Malicious Attacks on Networks, *PNAS,* 2011.
21. R. Ziff, Explosive Growth in Biased Dynamic Percolation on 2-D Regular Lattice Networks, *Phys. Rev. Lett.* 103: 045701, 2009.
22. da Costa, R. A. and Dorogovtsev, S. N. and Goltsev, A. V. and Mendes, J. F. F., Explosive Percolation Transition is Actually Continuous, Phys. Rev. Lett., 105, 255701, 2010.
23. R. Albert, H. Jeong & A-L Barabisi, Error and Attack Tolerance of Complex Networks, Nature, 406,378-382, 2000.

(2) PRINCIPAL ASPECTS

The present invention has three "principal" aspects. The first is a system for explosive network attack and mitigation strategies. The system is typically in the form of a computer system, computer component, or computer network operating software or in the form of a "hard-coded" instruction set. This system may take a variety of forms with a variety of hardware devices and may include computer networks, hand-held computing devices, cellular networks, satellite networks, and other communication devices. As can be appreciated by one skilled in the art, this system may be incorporated into a wide variety of devices that provide different functionalities. The second principal aspect is a method for explosive network attack and mitigation strategies. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) INTRODUCTION

In the present application, the Network Attack and Mitigation Strategy Analysis (NAMSA) system and its methods to quantify the robustness of a complex system and the effect of mitigation strategies are described. To understand, design, and build more sustainable and resilient complex systems is one of the main research frontiers in the emerging field of complex network science, Many studies (see Literature Reference Nos. 2, 6, 7, 20) have characterized the robustness of natural, social, technological, and engineered complex systems using complex network theories. These studies found several interesting insights. For example, the redundancy of links in networks alone does not necessary ensure the robustness, but the degree of inhomogeneous links in a network (so-called scale-free networks) plays an important role in system robustness against random failures/attacks (see Literature Reference No. 2). Most existing studies do not consider mitigations. The few studies that have considered mitigation are limited in using mitigation statically (i.e., rewire/reconfigure the system prior to any attacks). Moreover, the latest development of explosive percolation with Achlioptas processes (see Literature Reference No. 1) has not been considered in the framework of system robustness analysis.

The present invention approaches the problem of system robustness in terms of dynamical defense with explosive mitigation strategies and explores the possibility of explosive attack strategies. Within the present application, the exploration of how Achlioptas processes can be used as network attack strategies for enemy networks with unknown structures is first described. Then, a description of the formulation of the quantification of system robustness in the context of mission assurance where a system is constantly under attack, yet the mitigation ensures the survivability of complex systems to complete the mission even amid attacks is provided.

The present invention is relevant to application areas including, but not limited to, mission assurance, complex electronic circuits, supply chains, and ground or airborne vehicle communication systems. The invention can also be applied to the national security domain, such as electrical power grid infrastructure security, social and economic system resilience, and the mitigation of public unrest and social trends.

In the following, the NAMSA system and its methodology are first described, Achlioptas processes and explosive percolation are introduced, and Achlioptas processes as explosive attack strategies and mitigation strategies are formulated. Finally, the effectiveness of Achlioptas processes and explosive percolation in quantifying several canonical network models and real-world networks is demonstrated.

(4) SPECIFIC DETAILS (4.1) System and Methodology

The input to the Network Attack and Mitigation Strategy Analysis (NAMSA) system is a complex networked system (e.g., power grids, airline traffics, communication networks, biological networks, social media networks, simulated network models) and the output includes (1) the measured resilience of a complex network against various network attack strategies, and (2) the measured effectiveness of network mitigation strategies. The heart of the invention is the concept of utilizing Achlioptas processes as explosive attack and mitigation strategies to analyze the resilience of complex networks and the effectiveness of mitigations against attacks or failures.

An overview of the NAMSA system, according to the present invention, is illustrated in FIG. 1. As described above, the input to the system is a network structure of a complex system, either extracted from a real-world application or simulated from a graph generative model. The NAMSA system comprises eight major modules. In a first module 100, network structure is extracted from a complex system either based on a priori information (e.g., topological information of power-grid distribution, flight routes of airline networks), or based on observed stationary, regular interactions (e.g., communication networks based on mobile phone calls, social networks based on social media communications, regulatory transcription network based on gene expression). A network structure (i.e., model, map, architecture, graph) of complex systems 102 is the output of the first module 100.

In a second module 104, canonical random networks are simulated from graph generative models. A graph generative model is a process/software that generates canonical random network/graphs. In the present invention, the igraph package, which is a publically available software package for creating and manipulating undirected and directed graphs, was used to generate simulated network structures 106, non-limiting examples of which include Erdös-Rényi (ER) random graphs, scale-free networks, and small-world networks. As can be appreciated by one skilled in the art, other software packages can be used to generate these random networks (e.g., Gephi, Pajek). As described above, the network structure is either extracted from a real-world application (first module 100) or simulated from a graph generative model (second module 104).

After obtaining the network structure (reference elements 102 or 106), the invention proceeds to a third module 108 through which a network attack (or failure) method is selected. Non-limiting examples of selected attack methods 110 include random attack, targeted attack, usage-based failure, Erdös-Rényi (ER) random graphs, explosive percolation acceleration strategies (EP-acl), and explosive percolation delay strategies (EP-del), which will be described in further detail below.

From the third module 108, the path continues through either a resilience quantification process (arrow 112) or a mitigation effectiveness quantification process (as indicated by arrow 114). The mitigation effectiveness quantification process first begins with a fourth module 116 with which network mitigation strategies are selected. The selected mitigation methods 118 include, but are not limited to, random repair and targeted repair. The selected mitigation methods 118 are used in a fifth module 120 in which the system simulates attack-mitigation competing processes and records snapshots of network structure after each interaction. Thus, a sequence of network structures under competing processes 122 is generated. The attack strategies/methods are obtained from the third module 108. Based on the sequence of network structures under competing processes 122, a sixth module 124 quantifies the effectiveness of the mitigation strategies against attack strategies.

Returning to the resilience quantification process, after selecting an attack (failure) strategy in the third module 108, the selected attack method 110 is utilized by a seventh module 126. The seventh module 126 simulates attacks (failures) without mitigation and records snapshots of the network structure after each individual attack to generate a sequence of network structures under attack 128. The fifth module 120 takes the attack strategy selected in the third module 108 (arrow 114) and the mitigation strategy selected in the fourth module 116 (i.e., selected mitigation method 118) and simulates attack and mitigation within the fifth module 120. An eighth module 130 quantifies network resilience when non-mitigation is executed, whereas the sixth module 124 quantifies the effectiveness of mitigation. For both quantification of network resilience (eighth module 130) and quantification of the effectiveness of mitigation (sixth module 124), the size of giant components 132 (i.e., the size of connected components survived to provide the function of a system) is assessed for the quantifications, as will be described in detail below.

FIG. 1 shows two possible paths of executions. The first path proceeds as follows: the first module 100/the second module 104→the third module 108→the seventh module 126→the eighth module 130. This path shows the effectiveness of different attack strategies if no mitigation is chosen, where the final effectiveness of the attack strategy is measured in the eighth module 130. The second path shows the interaction among failure and mitigation. The second path proceeds as follows: the first module 100/the second module 104→the third module 108/the fourth module 116→the fifth module 120→the sixth module 124. The final effectiveness of mitigation is measured in the sixth module 124.

(4.2) Achlioptas Processes and Explosive Percolation

Explosive percolation is the phenomenon of discontinuous phase transition of the emergence of a giant component in network evolution. A giant component is a connected component of a given random graph that contains a constant fraction of the entire graph's vertices. It is widely believed that phase transition of the giant component is continuous, since the seminal work of Erdös and Rényi random graph process. Achlioptas (see Literature Reference No. 1) first reported the simulated explosive percolation transition using edge choice model with product or sum rules. However, Achlioptas process, including the class of edge choice model, was later mathematically rigorously proved that if the number of nodes is truly infinite, explosive percolation transition is actually continuous (see Literature Reference No. 18). Nevertheless, any finite system investigated so far still shows a discontinuous jump even for a system as large as $10^{18}$ nodes (see Literature Reference No. 22).

Following is a comparison of the process of the emergence of giant components in a conventional Erös-Rényi (ER) random graph process and an Achlioptas process. In the ER process, one edge is randomly picked to connect two nodes at a time; as more edges are added, the network becomes more and more connected. The size of the largest connected components (giant components) in the network is gradually increased and goes through second order phase transitions. The size refers to the number of nodes of the connected clusters/components.

In the Achlioptas process, two edges are randomly picked, and an edge selection rule (product, sum, or other rule) is applied to keep one edge by adding them into the network and discarding the other. As the process progresses, the size of the giant component can go through either second order or first order phase transition (explosive percolation) depending on the selection rule.

For example, two edges $e_1$ and $e_2$ are randomly picked for the application of (minimum and maximum) product rules over the size (i.e., the number of nodes) of connected components (clusters). In this non-limiting example, edge $e_1$ connects a two-node and a seven-node cluster, whereas edge $e_2$ connects a four-node cluster and another four-node cluster. The minimum product rule will pick the edge $e_1$ that has the smaller product of connected cluster sizes ($2 \times 7=14$), whereas the maximum product rule will pick the edge $e_2$ that has the larger product of connected cluster sizes ($4 \times 4=16$). The important findings, described in Literature Reference No. 1 are that the minimum product rule not only delays the onset of phase transition, but also leads to discontinuous phase transition (i.e., first order phrase transition), whereas the maximum product rule accelerates the onset of phase transition, as shown in FIG. 2 and described below.

Figure 2:
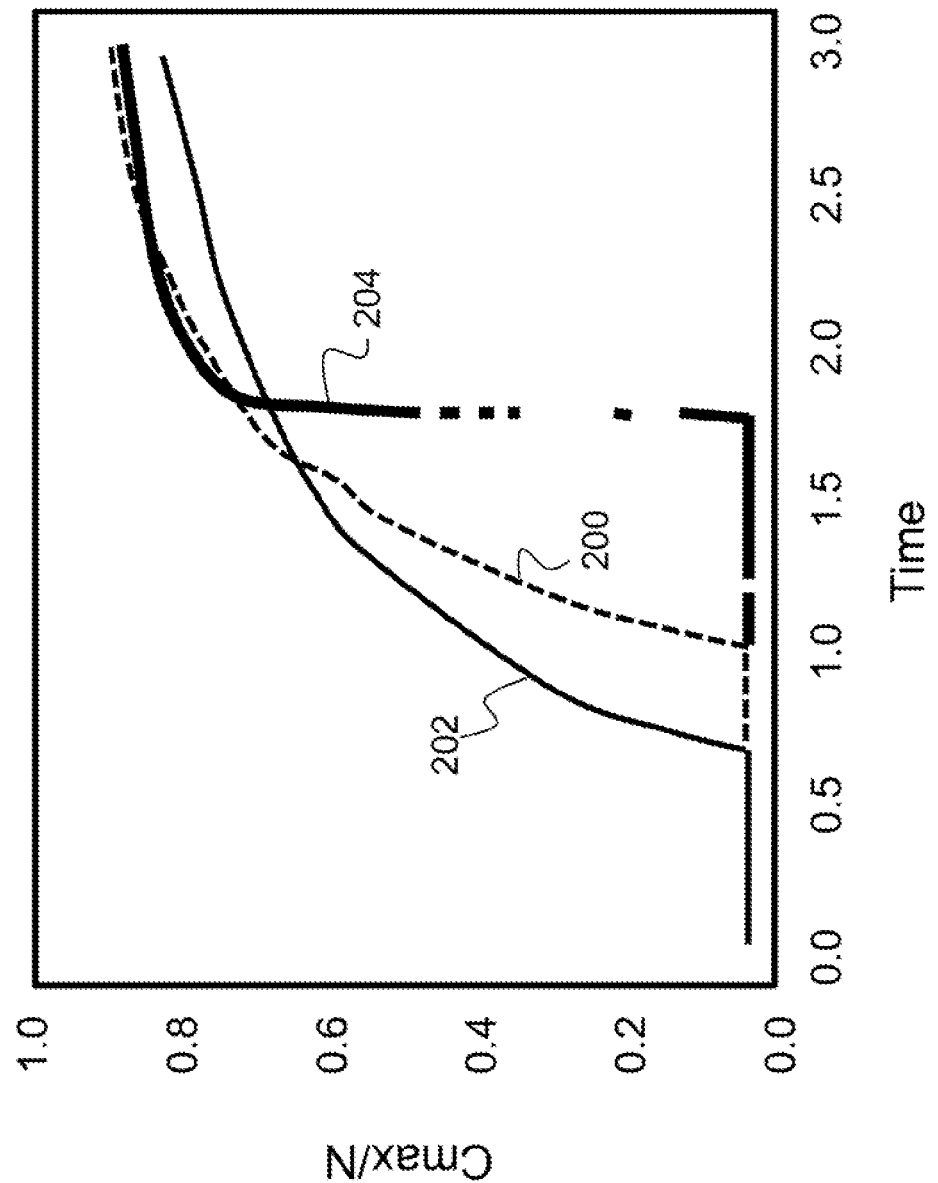
FIG. 2 illustrates a comparison of explosive percolation between the Erdös and Rényi (ER) random graph process and Achlioptas processes according to principles of the present invention.

FIG. 2 is a plot showing a comparison between ER and Achlioptas processes. Along the x-axis is time, and along the y-axis is Cmax/N, where N is the total number of nodes in the network and Cmax is the size (i.e., the number of nodes) of the largest clusters in the network. The ER process (represented by the dashed curve 200) goes through continuous phase transition. The minimum product rule of Achlioptas process (represented by the solid line curve 202) accelerates the onset of phase transition (curve shifted toward the left), and the maximum product rule (represented by the bold solid curve 204) delays the onset and shows discontinuous phase transition.

(4.3) Explosive Attack Strategies

Attacks or failures of complex systems (non-limiting examples of which include failures of power transmission lines or attacks on computer network routers) can be modeled as the loss of links (i.e., deletion of edges) or functionality of entities (i.e., deletion of nodes). Two major attack categories have been investigated in quantifying the effect of network attacks or failures: random attack and targeted attack (see Literature Reference No. 23). Random network attacks (failures) are typically conducted by sampling which nodes or links to attack (fail). Targeted attacks, on the other hand, select the nodes or links to fail based on the ranking of graph entities (e.g., node or edge centrality) with domain specific threshold values. In the present invention, explosive network attack strategies are employed by applying Achlioptas processes. Explosive attacks are considered one type of random network attacks.

The procedure of explosive attacks for a known network structure is described below. Referring to FIG. 1, this procedure is equivalent to an attack strategy selected in the third module 108, and the step of explosive attack is executed in the seventh module 126.

1. Load a priori known network structure $G_n = \{V, E\}$ for a complex system.
2. Randomly select two failing candidates (node) $n_i$ and $n_j$ from $G_n$; let $$G_i = \{V, E\}, \text{ where}$$

$E' = E - \{e \in (n_i, n_k) | n_k \in \text{neighbor}(n_i)\}$, denotes the subgraph of $G_n$ after removing the edges emitting from $n_i$, and $G_j$ for $n_i$ correspondingly. Note that using edges as failing candidates can be defined in the similar manner. Failing nodes here are used for illustration purposes only.

3. Identify and compute the size of disconnected components in $G_i$ and $G_j$, due to the deletion of edges emitting from $n_i$ and $n_j$, respectively.
4. Apply selection rules (e.g., max/min product/sum rule) to select one of the failing candidates and discard the others.
5. Compute and record the size of giant components.
6. Repeat steps 2-5 until all failing candidates are exhausted.
7. Quantity the phase transition of network fragmentation using the size of giant components.

Figure 3:
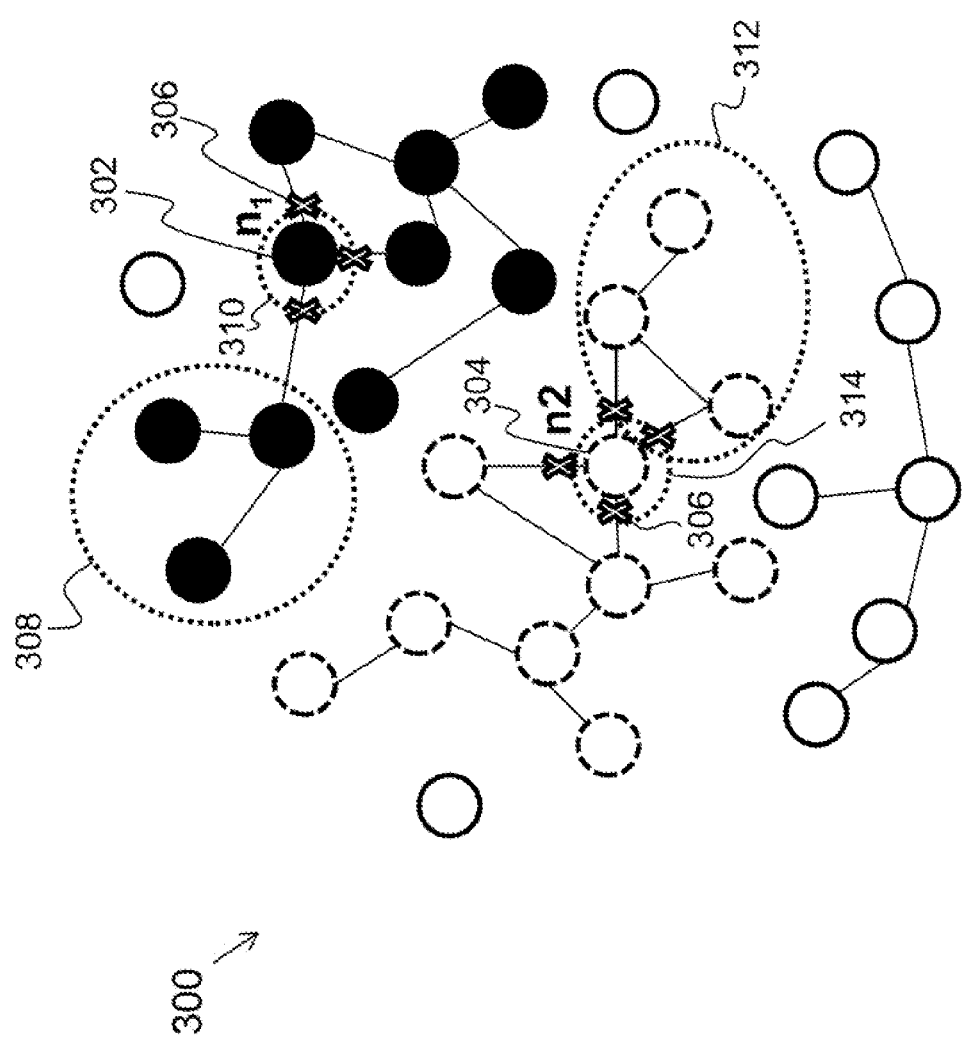
FIG. 3 illustrates an explosive network attack on a known network structure according to principles of the present invention.

FIG. 3 is an illustration of an explosive network attack on a known network structure 300. Nodes $n_1$ 302 and $n_2$ 304 are randomly selected as failing candidates. The crosses 306 indicate the failing edges (lines) that connect $n_1$ 302 and $n_2$ 304 to their neighboring nodes. Failing node $n_1$ 302 results in three disconnected components with the product of their sizes as 18 ($3 \times 1 \times 6 = 18$). These numbers are based on the size (number of nodes) of the clusters/components. For example, in FIG. 3, a first cluster 308 has three nodes, node $n_1$ 302 represents a second cluster 310 with one node, and the remaining nodes connected with node $n_1$ 302 represent a third cluster having six nodes. Failing node $n_2$ 304 results in disconnected components with the product of their sizes as 21 ($3 \times 1 \times 7 = 21$), which are based on a fourth cluster 312 of three nodes, a fifth cluster 314 with one node, node $n_2$ 304, and a sixth cluster comprising the seven remaining nodes connected with node $n_2$ 304. The failing node is selected based on the product of the sizes of the disconnected components. If one selects the node with the smaller product (e.g., node $n_1$ 302), the onset of defragmentation will be accelerated. If one selects the node with the larger product (e.g., node $n_2$ 304), the onset of defragmentation will be delayed.

To apply explosive attacks to the unknown network structure of an enemy's network, one can assume that one has a rough estimate of the number of nodes in enemy's network. The procedure can be described as follows:

1. Create an unconnected network G with n number of nodes estimated from the size of enemy's network.
2. Randomly select two edges to add into G.
3. Apply Achlioptas' selection rule (i.e., max/min product/sum rule) to determine which edge to add, and which to drop.
4. Compute and record the size of giant components.
5. Repeat Step 2-4 till adding the desirable number of edges (e.g., 1.5 times the number of nodes).
6. Quantity the phase transition of the connectedness of network attack points using the size of giant components.

The Achlipotas process is utilized to grow a connected network of attack points (nodes), where the edges in this network may not be the same as the edges in an enemy's unknown network structure. However, in the present invention, one can consider placing attack routines (e.g., software bugs) on the nodes and waiting to invoke simultaneous attacks until most of the nodes in the enemy's network (emergence of the giant component in the connected network) are connected, which in essence destroys most of the enemy's nodes. Applying different selection rules, one can either (a) delay the onset of explosive percolation to paralyze the system suddenly and unexpectedly, or (b) accelerate the onset of structure phase transition to induce defenders' response strategies.

(4.4) Explosive Mitigation Strategies

Conventional robustness analysis of complex network targets the quantification of how resilient a network (e.g., the size of connected components survived to provide the function of a system) is against a specific attack strategy (e.g., random attack or failure). The quantification of network robustness is then compared across complex systems in different application domains, such as biological networks and power-grid networks, to derive the principal building blocks or the origin of robustness in complex systems. Rewiring or reconfiguration of complex networks is then proposed to improve the robustness of the system. Although this approach has advanced greatly the understanding of how network structure influences the robustness of a system, there is an increasing need to quantify the robustness of a system in a more dynamic setting (e.g., mission assurance) where repairs or mitigations are conducted as attacks or failures attempt to advance.

The invention described herein quantifies system robustness against attack in the framework of competition processes between attacks and mitigations. Explosive mitigation strategies are developed to mitigate network attacks, or failures. The effectiveness of mitigation strategies is quantified based on the changes in the size of giant components (survived functionality) and the time delay in collapse of system connectivity, as described below. In other words, the present invention goes beyond the size of survived giant components to inspect the time steps needed toward the collapse.

First described is the procedure of analyzing system robustness as a competition process between attack and mitigation. This procedure is the mitigation effectiveness quantification process described above and illustrated in FIG. 1. The procedures is as follows:

1. Load the network structure of a complex system—simulated or observed (FIG. 1, 102 or 106).
2. Select an attack method (e.g., random ER attack, random explosive attack, targeted centrality attack (see Literature Reference No. 2)) (FIG. 1, 108).
3. Select a mitigation method (e.g., random ER mitigation, explosive mitigation attack, targeted first-in-first-out (FIFO) repair (i.e., repair links in a first-fail-first-repair manner)) (FIG. 1, 110).
4. Simulate one attack (failure) (e.g., randomly remove one edge from the network) according to the selected attack method (e.g., random ER method) (FIG. 1, 120).
5. Compute the size of the giant component (largest component) in the attacked network (FIG. 1, 124).
6. If the size of the giant component falls below a predetermined mitigation threshold, continue on to step 7; otherwise, go to step 4 to simulate another attack.
7. Simulate one mitigation (e.g., randomly pick two edges from previously failed edges and select one to repair according to Achlioptas' selection rule) (FIG. 1, 120).
8. Compute and record the size of the giant component (largest component) of the mitigated network (FIG. 1, 124).
9. Stop Go to Step 4, if not reach the limit of simulation iteration (e.g., simulating edge attack over 1.5 times the number of nodes).

This framework tolerates expected attacks (disruption) due to maintenance or transient noises in complex systems via the mitigation threshold which pre-specifies at what loss of functionality (measured as the decrease of the size of the giant components) a mitigation strategy should be engaged. For example, the scheduled equipment maintenance of a power grid may take down a few components, similar to failures/attacks or sudden surges in power demands (e.g., Super Bowl television show) leading to transient noise deviations from normal operational patterns in power grid distribution. The mitigation threshold of the present invention is designed to allow such tolerance so that one does not need to engage mitigation for expected fluctuation in system operations.

The explosive mitigation strategy outlined in step 7 utilizes Achlioptas' selection rule to pick randomly from one of previous failed edges to repair. Such a mitigation strategy is especially useful for those systems that are constrained by the fixed topology, such as failures of transmission lines in power grid. However, it is also possible to go beyond using failed edges for applications that are not constrained by fixed topology. For example, in wireless network communications, one could apply Achlioptas' process to any four nodes in the network, regardless if there were two failed edges between these two nodes, since one can establish new peer-to-peer wireless connections easily in this setting.

To quantify the effectiveness of mitigation, two measures based on the changes in the sizes of the giant components recorded in attack-mitigation competition are considered. First, the final sizes of the giant component at the end of the simulation are considered as a measure of how effective the mitigation method ensures the functionality of the system. This measure is called survival size. Second, a pre-defined fragmentation threshold of the size of the giant component is considered, and the time delay in reaching the fragmentation threshold is quantified as a measure of how effective the mitigation method delays the loss of functionality of the system. This measure is called onset delay.

Figure 4A:
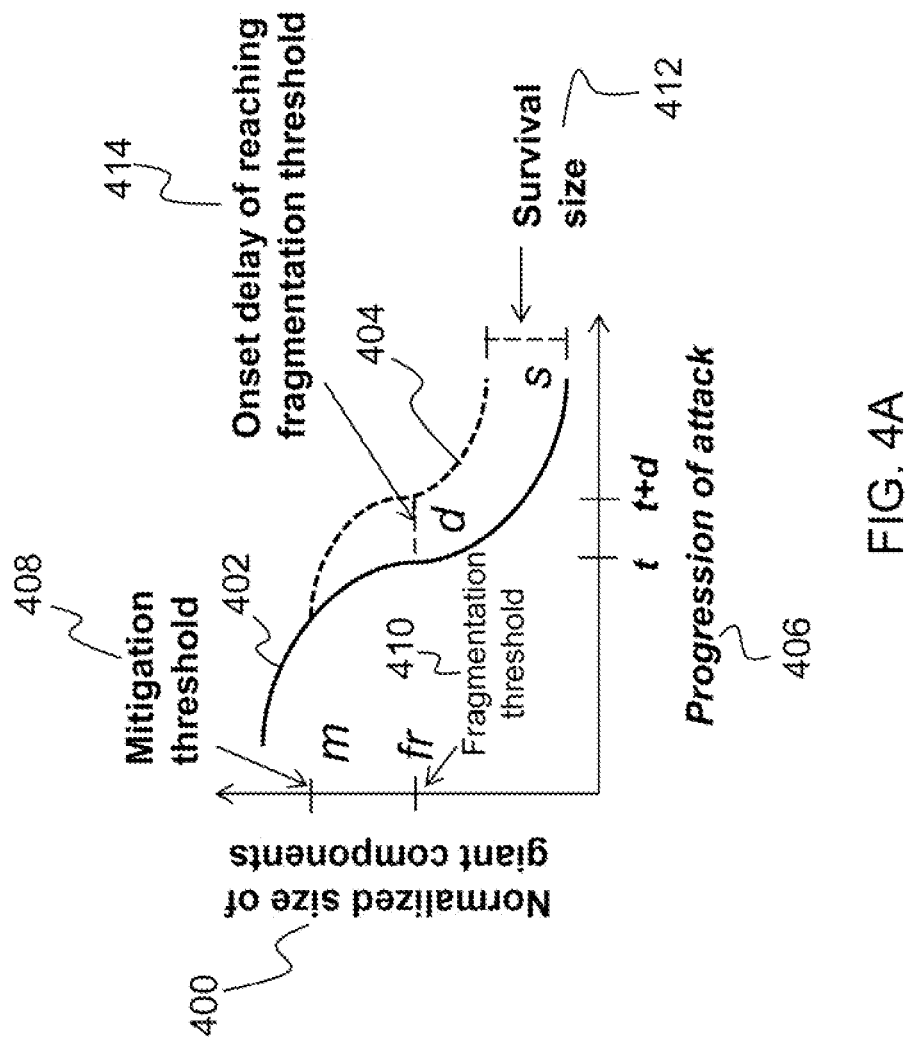
FIG. 4A illustrates the change in the size of the giant component as an attack progresses, comparing mitigated to non-mitigated simulations according to principles of the present invention.

FIGS. 4A-4C illustrate the derivation of these two measures. Specifically, FIGS. 4A-4C illustrate how onset delay and survival size measures quantify the effectiveness of mitigation strategies amid attack. FIG. 4A is a plot of the normalized size of giant components for network structures 400 (along the y-axis) in the mitigated (solid curve 402) and non-mitigated (dashed curve 404) simulations with respect to the progression of attack 406 (along the x-axis). In other words, the change in the size of the giant component is plotted as attack progresses. The mitigation threshold (m) 408 and fragmentation threshold (fr) 410 for the simulation is marked on the y-axis. The survival size (s) 412 measure and the onset delay (d) 414 measure are also shown.

FIG. 4B is a plot of the onset delay 414 of fragmentation in FIG. 4A as a point 416 with respect to the mitigation threshold 408 and the fragmentation threshold 410. Note that given the simulation plotted in FIG. 4A, one can form a trajectory of onset delay by varying the fragmentation threshold in the plane perpendicular to m. In FIG. 4C, a point 418 of survival size 412 in FIG. 4A is plotted in relation to mitigation threshold 408. Simulations with various mitigation thresholds will generate multiple figures similar to FIG. 4A, a surface plot in FIG. 4B, and a curve in FIG. 4C. Therefore, one can have a more comprehensive characterization of the effectiveness of mitigation strategies with respect to the range of mitigation thresholds, enabling one to analyze the engagement of mitigation in a broader policy context.

(4.5) Experimental Results (4.5.1) Explosive Network Attack on Unknown Network Structure Explosive attack strategies were simulated on unknown network structures ranging from 50 nodes up to 30,000 nodes. The effectiveness of delay and acceleration of network attack strategies was demonstrated in these studies. FIGS. 5A-5D and FIGS. 6A-6D show the simulation results. The horizontal axes in the figures represent the progression of placing attacking points as the ratio (r) of the number of added edges (e) to the total number of nodes (n), or $$r = \frac{e}{N}.$$

The vertical axes show the normalized size of the giant components average (C) over the number of simulated runs (N), or C/N. The experimental results demonstrate that the explosive percolation phenomena are robust and effective for unknown network structures with a wide range of network sizes.

Figure 5A:
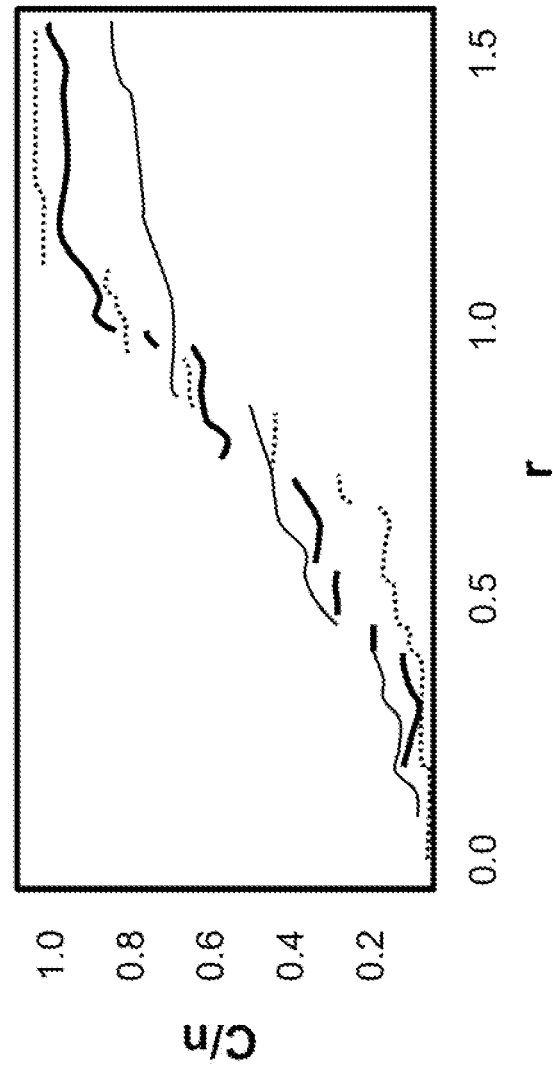
FIG. 5A illustrates results of a simulation of explosive attack on unknown network structures for a network with 50 nodes, comparing acceleration and delay mitigation strategies with an ER random graph process according to principles of the present invention.
Figure 5B:
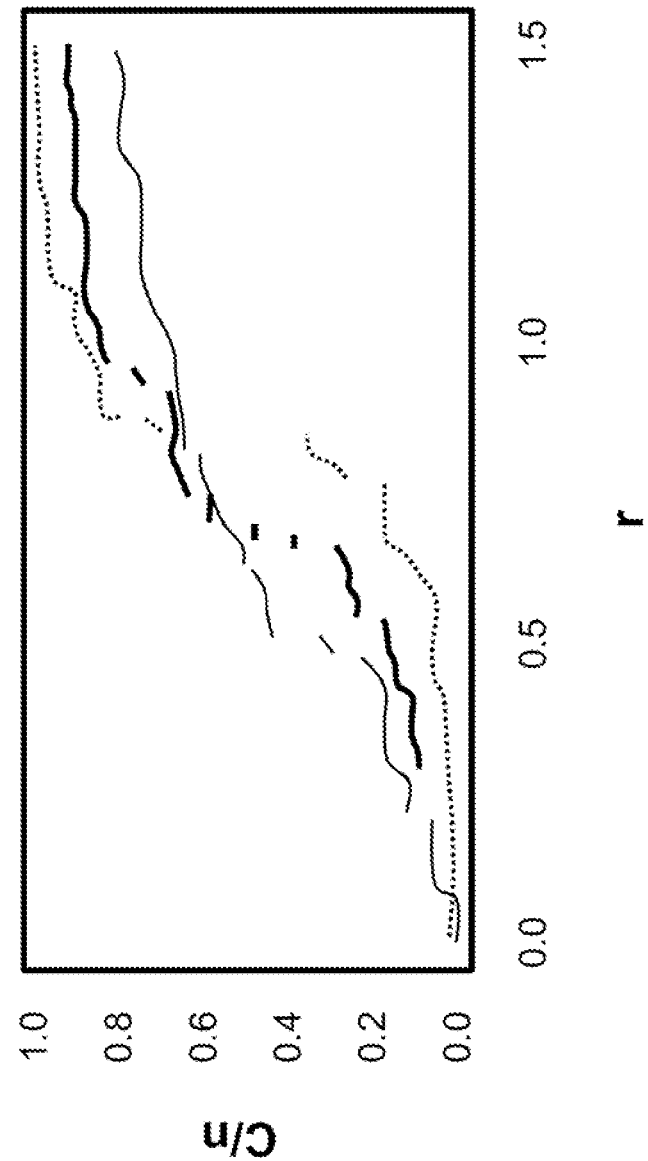
FIG. 5B illustrates results of a simulation of explosive attack on unknown network structures for a network with 100 nodes, comparing acceleration and delay mitigation strategies with an ER random graph process according to principles of the present invention.
Figure 5C:
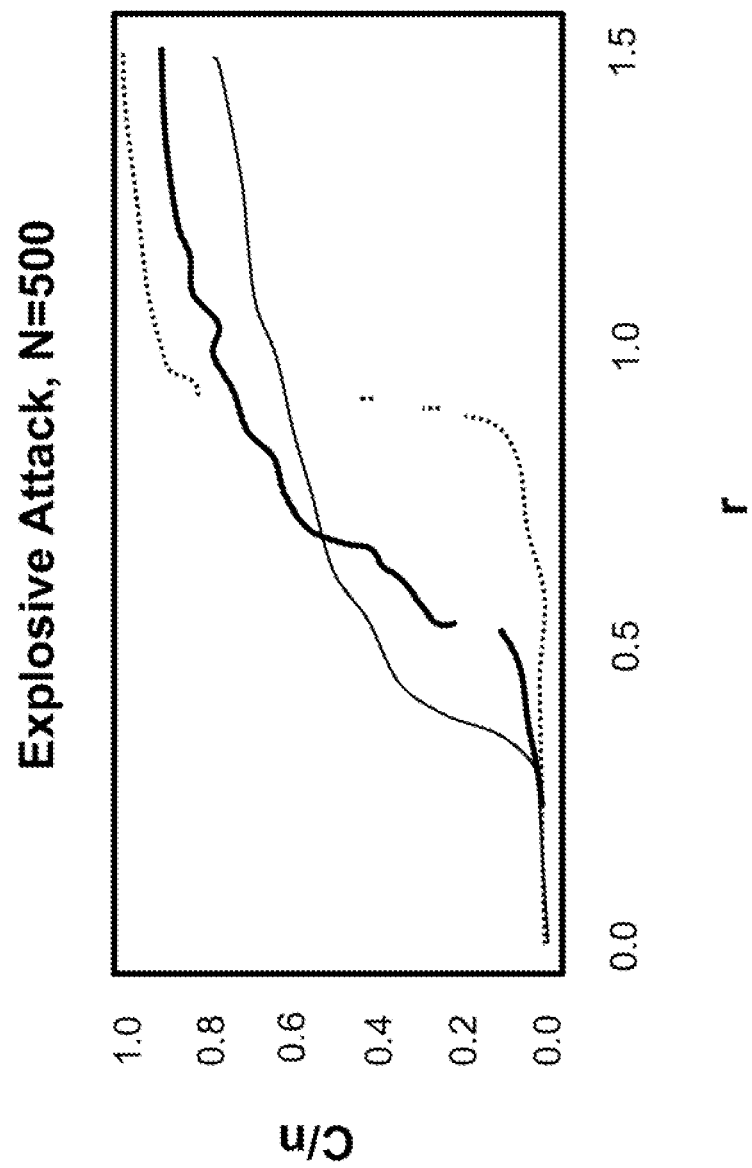
FIG. 5C illustrates results of a simulation of explosive attack on unknown network structures for a network with 500 nodes, comparing acceleration and delay mitigation strategies with an ER random graph process according to principles of the present invention.
Figure 5D:
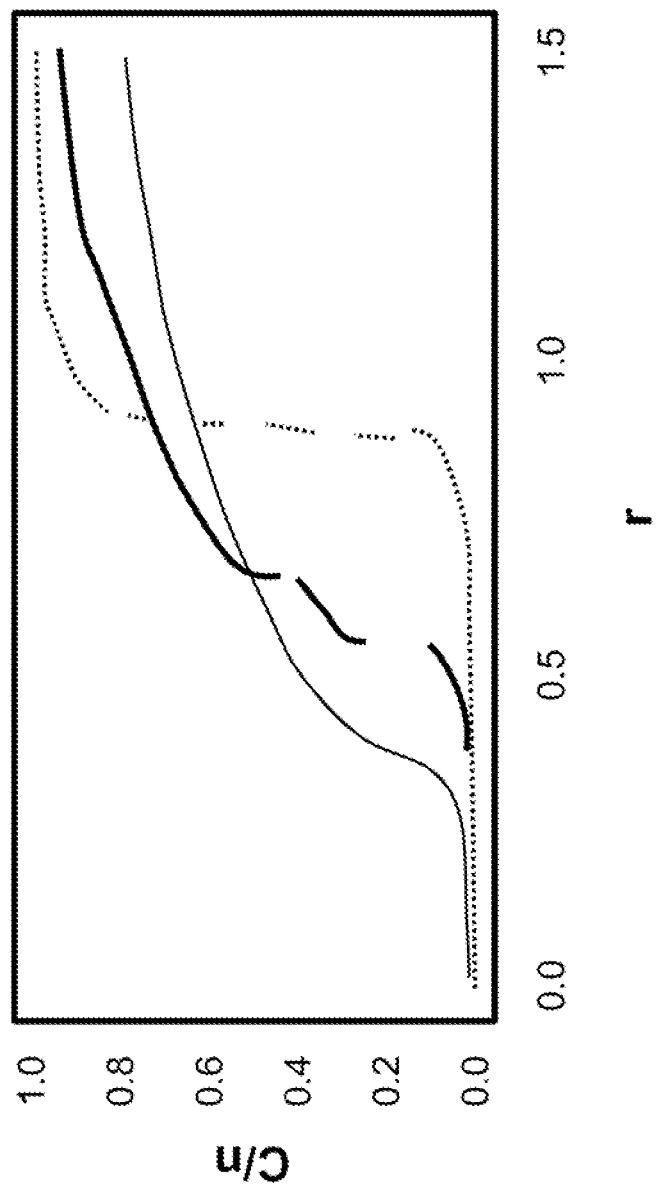
FIG. 5D illustrates results of a simulation of explosive attack on unknown network structures for a network with 1000 nodes, comparing acceleration and delay mitigation strategies with an ER random graph process according to principles of the present invention.
Figure 6A:
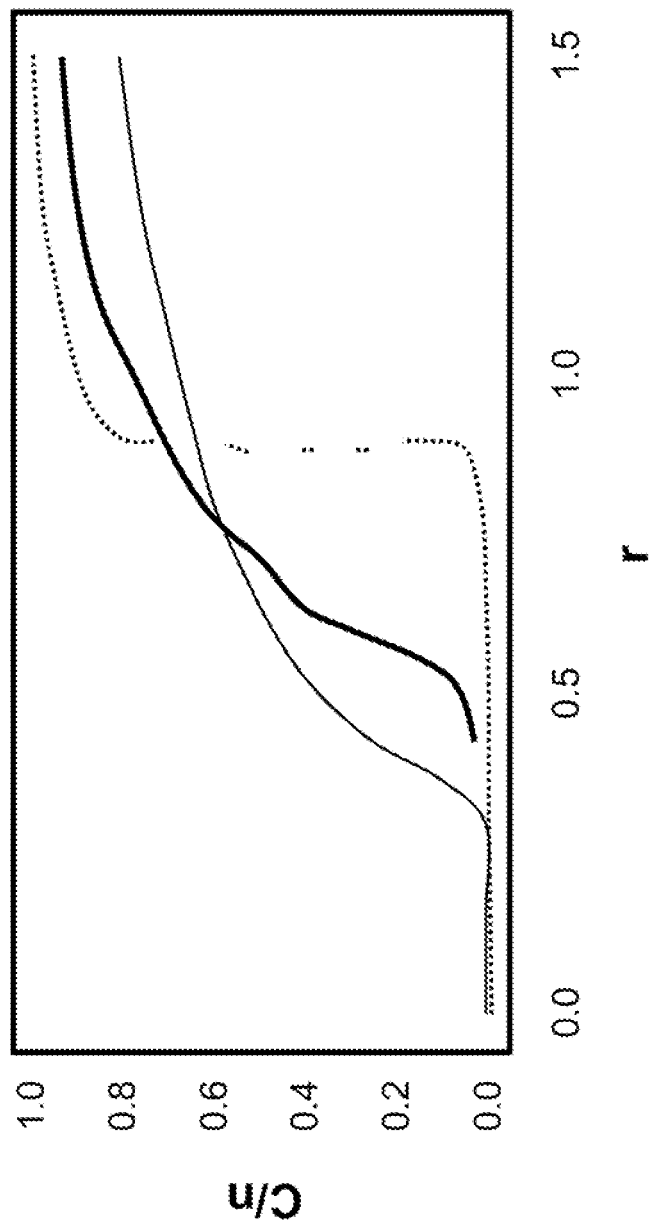
FIG. 6A illustrates results of a simulation of explosive attack on unknown network structures for a network with 5000 nodes, comparing acceleration and delay mitigation strategies with an ER random graph process according to principles of the present invention.
Figure 6B:
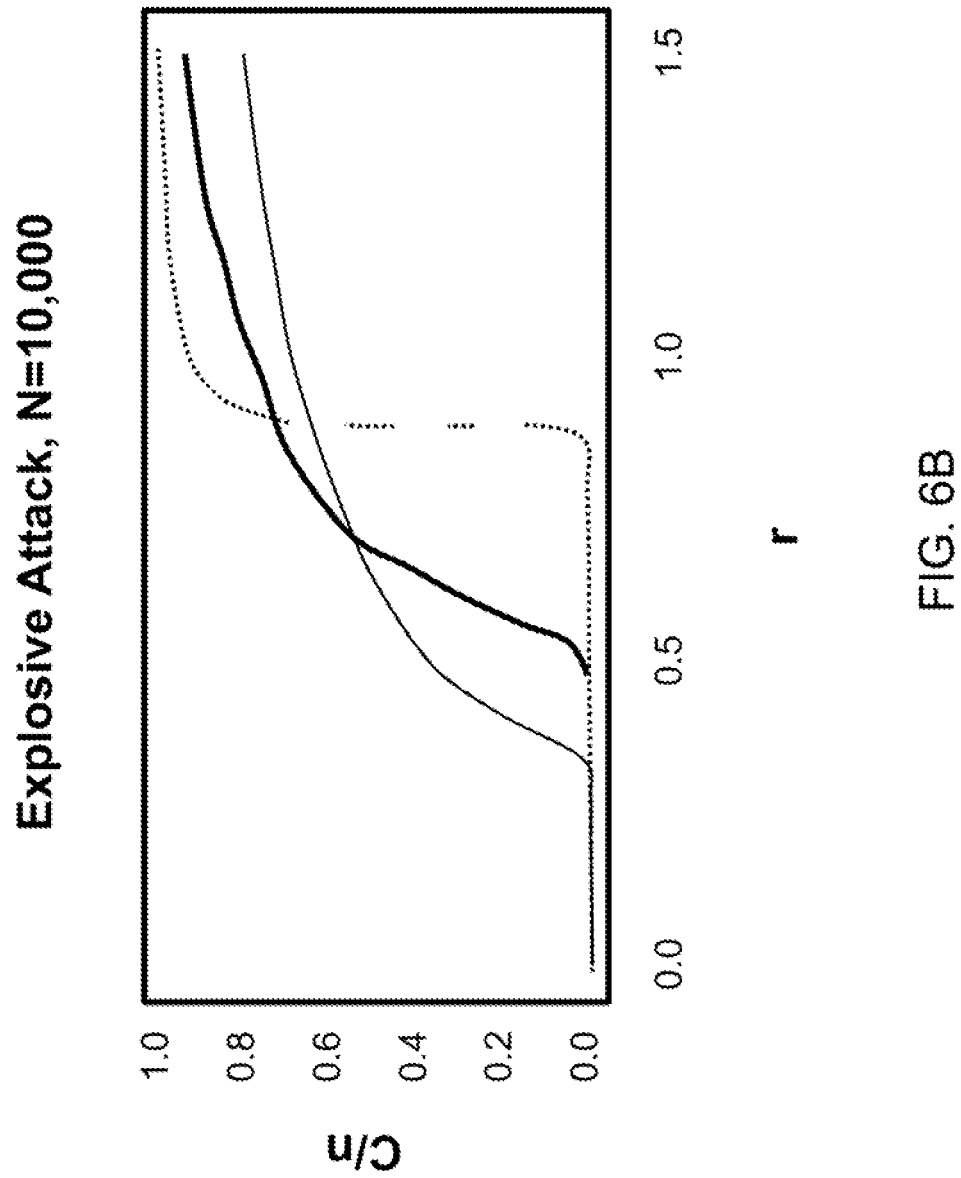
FIG. 6B illustrates results of a simulation of explosive attack on unknown network structures for a network with 10,000 nodes, comparing acceleration and delay mitigation strategies with an ER random graph process according to principles of the present invention.
Figure 6C:
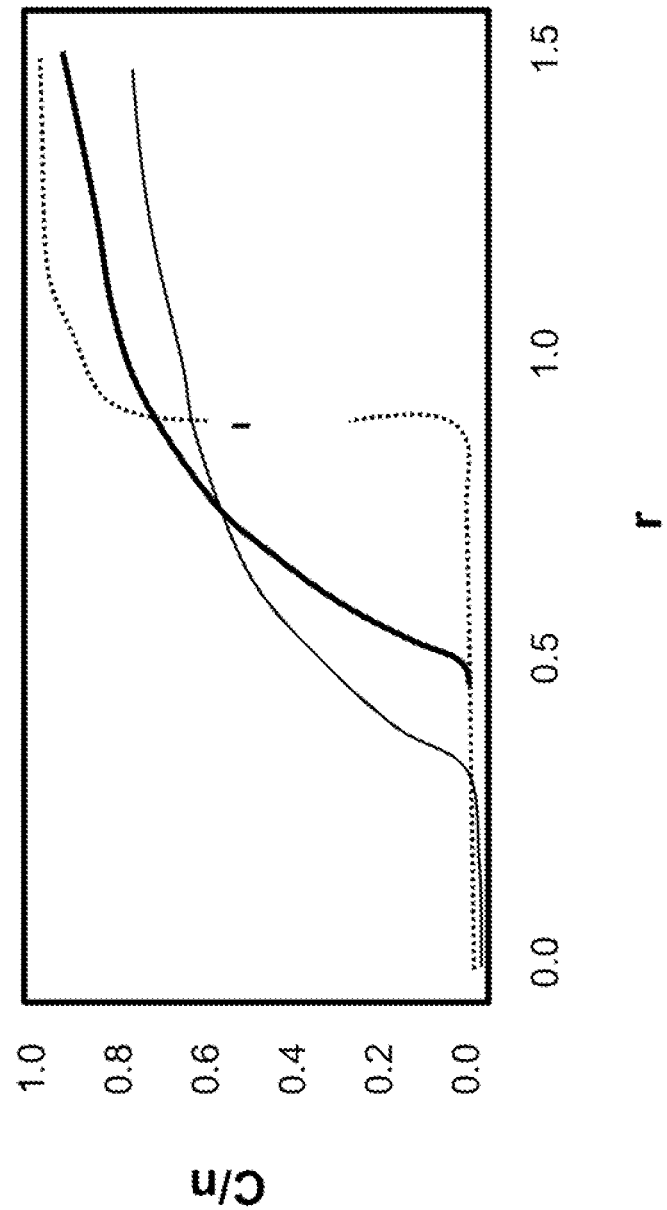
FIG. 6C illustrates results of a simulation of explosive attack on unknown network structures for a network with 20,000 nodes, comparing acceleration and delay mitigation strategies with an ER random graph process according to principles of the present invention.
Figure 6D:
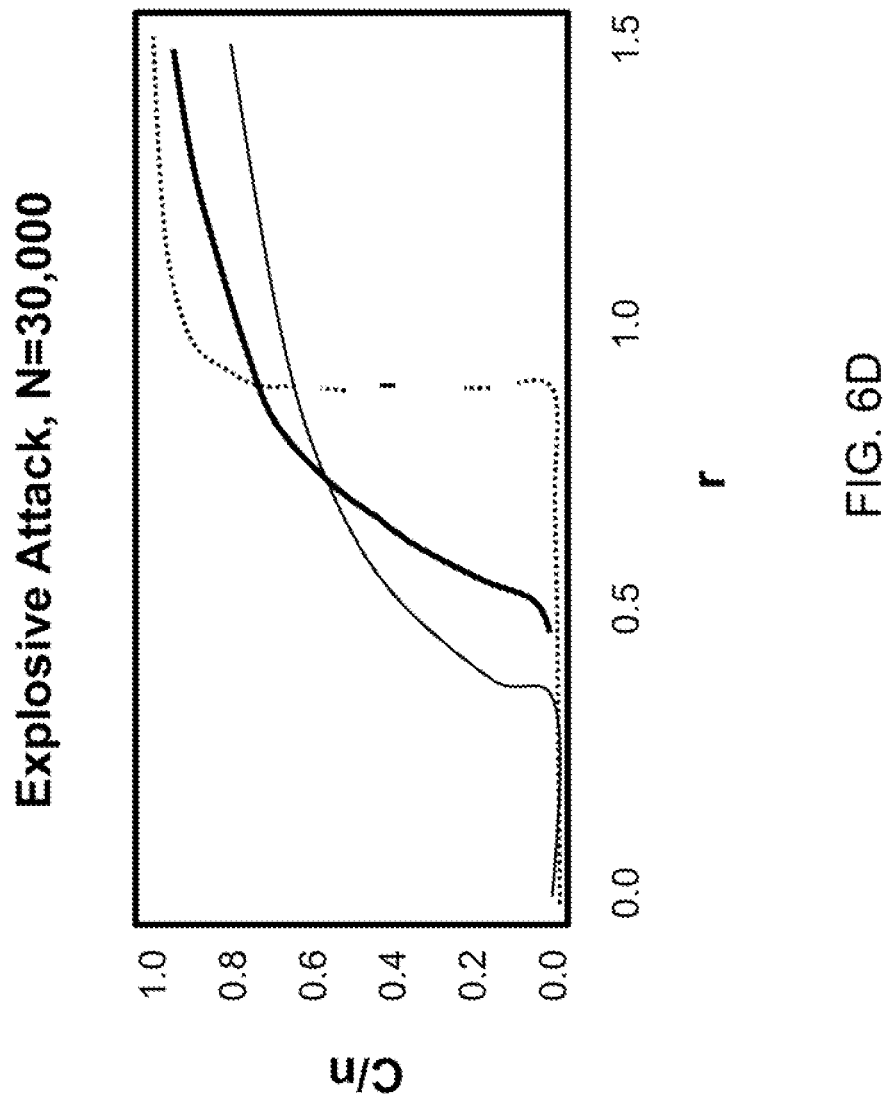
FIG. 6D illustrates results of a simulation of explosive attack on unknown network structures for a network with 30,000 nodes, comparing acceleration and delay mitigation strategies with an ER random graph process according to principles of the present invention.

FIGS. 5A-5D illustrate simulation of explosive attack on unknown network structures for networks with 50 nodes (FIG. 5A), 100 nodes (FIG. 5B), 500 nodes (FIG. 5C), and 1000 nodes (FIG. 5D). In each of these figures, both acceleration (solid line curves) and delay (dashed line curves) of the onset of phase transition are contrasted with an ER random model (bold line curves). This is to demonstrate the delay and acceleration of onset compared to ER random. The curve of ER (bold line curve) in positioned between the curves of accelerations and delay curves. FIGS. 6A-6D illustrate simulation of explosive attack on unknown network structures for networks with 5000 nodes (FIG. 6A). 10,000 nodes (FIG. 6B), 20,000 nodes (FIG. 6C), and 30,000 nodes (FIG. 6D). In each of these figures, both acceleration (solid line curves) and delay (dashed line curves) of the onset of phase transition are contrasted with an ER random model (bold line curves). This demonstrates that the observed delay or acceleration of onset is robust across different sizes of networks (i.e., nodes ranging from 5,000 up to 30,000 nodes).

(4.5.3) Explosive Network Mitigation on Electrical Power Grid

Figure 7:
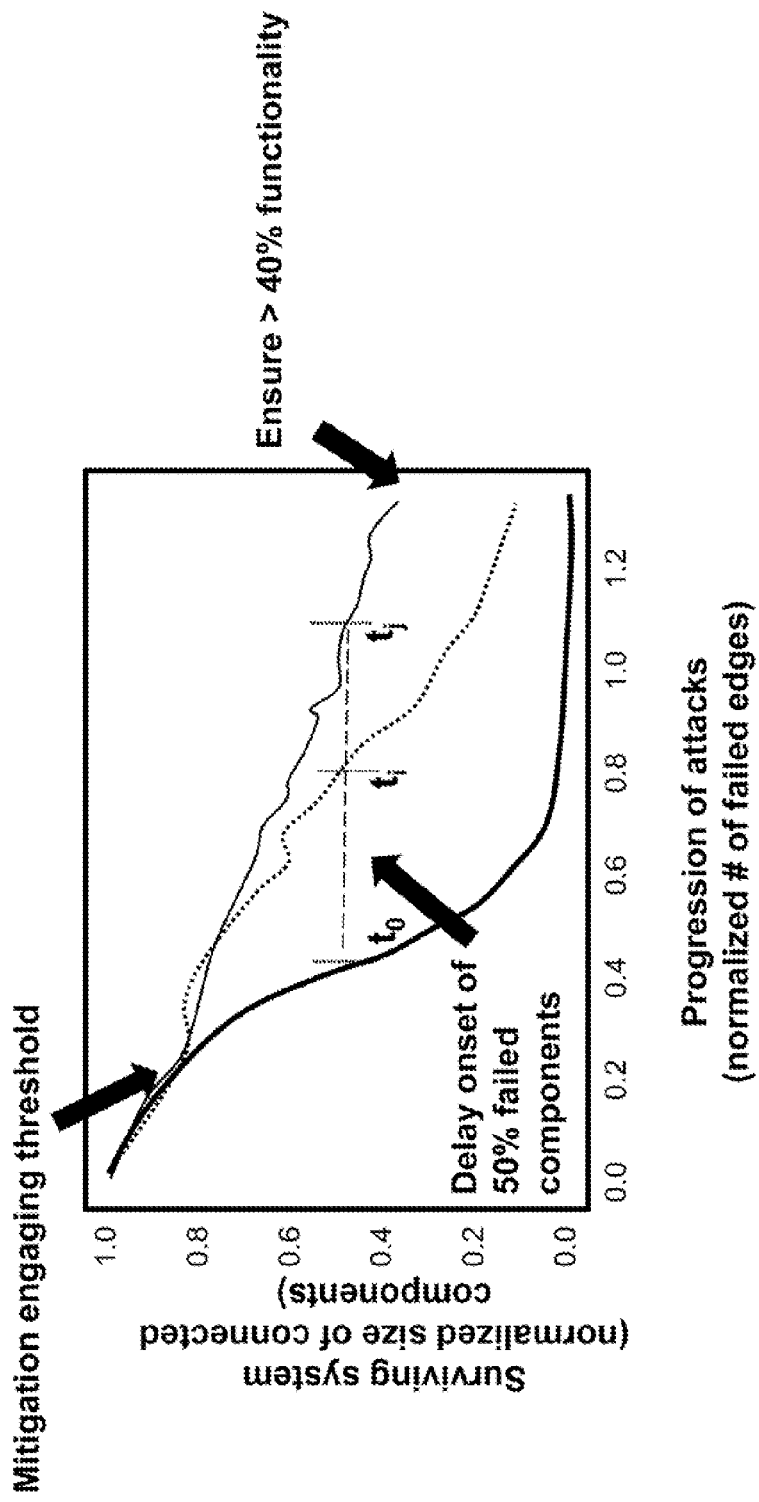
FIG. 7 illustrates results of a simulation showing that random failures on the northwestern power grid are mitigated with explosive mitigation strategies according to principles of the present invention.

The effectiveness of explosive mitigation strategies of the present invention was studied on a Northwestern power grid network comprising 4941 nodes and 6594 edges. Random attacks (failure) and their competition interactions with explosive mitigation strategies were simulated for a wide range of mitigation thresholds. FIG. 7 shows the results for survival size and onset delay for mitigation threshold 0.85 and fragmentation threshold 0.5. From the results, one can see that explosive mitigation of the present invention ensures 40% functionality (survival size) and delays the fragmentation of reaching 50% functionality from time $t_0$ to $t_j$. Specifically, the acceleration mitigation strategy (represented by the solid line curve) ensures greater than 40% functionality. The onset delay is shown as ($t_j$-$t_0$) for fragmentation threshold at 50% (i.e., 50% failed components). The dashed line curve represents the delay mitigation strategy, and the bold line curve represents random attack with no mitigation.

In summary, the present invention provides explosive attack strategies based on Achlioptas processes that can (a) delay the onset of explosive percolation to paralyze the system suddenly and unexpectedly, and (b) accelerate the onset of structure phase transition to induce defenders' response strategies. Furthermore, the invention described herein comprises explosive attack/failure mitigation strategies based on Achlioptas processes that can (a) mitigate attacks by delaying the spread of attack, and (b) ensure partial functionality that survives the attack. Finally, the formulation of network attack and mitigation interactions as a competition process enables the quantification of the effectiveness of mitigation strategies as a function of time and network connectivity.

Figure 8:
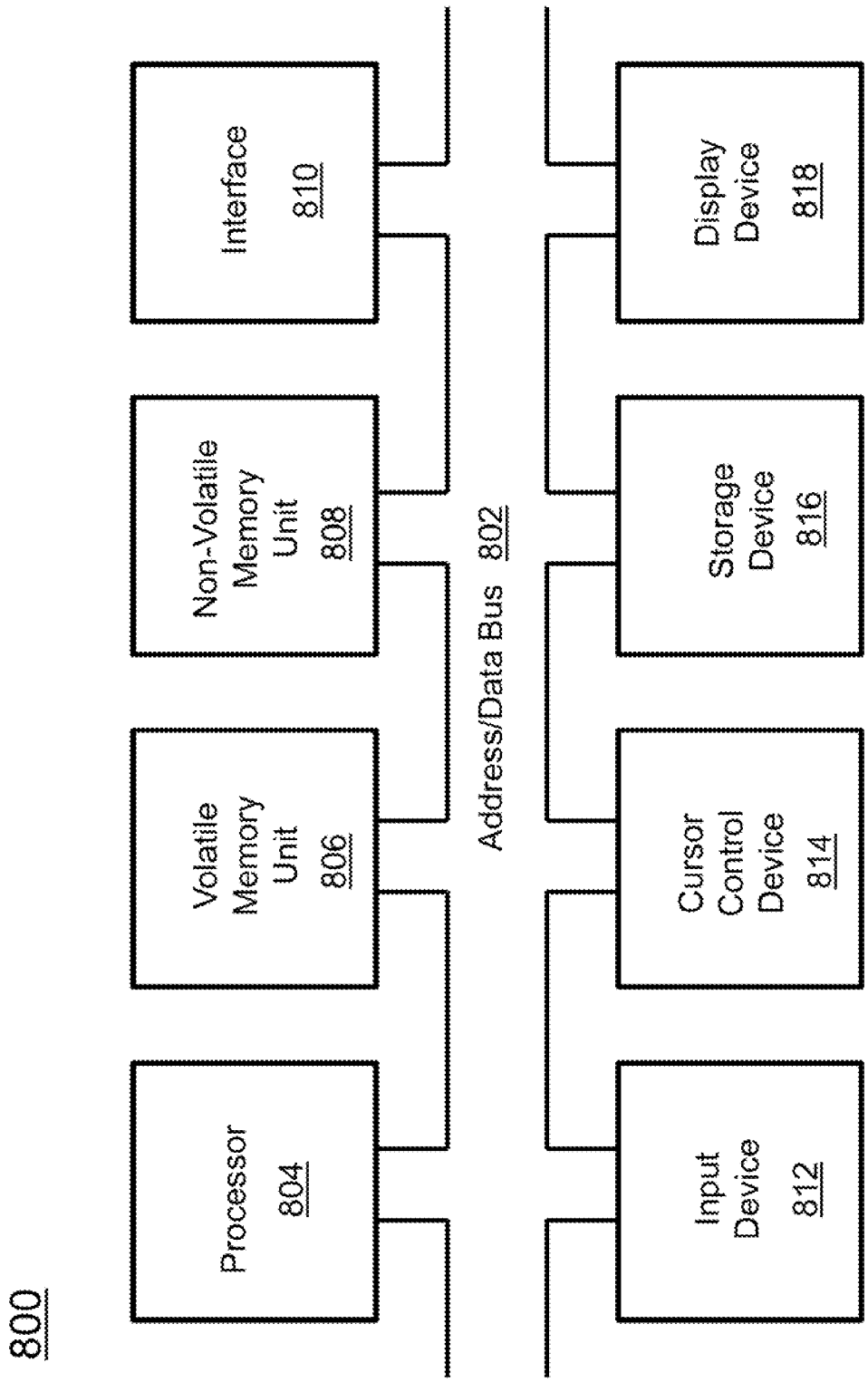
FIG. 8 is an illustration of a data processing system according to principles of the present invention.

An example of a computer system 800 in accordance with one aspect is shown in FIG. 8. The computer system 800 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 800. When executed, the instructions cause the computer system 800 to perform specific actions and exhibit specific behavior, such as described herein.

The computer system 800 may include an address/data bus 802 that is configured to communicate information. Additionally, one or more data processing units, such as a processor 804, are coupled with the address/data bus 802. The processor 804 is configured to process information and instructions. In one aspect, the processor 804 is a microprocessor. Alternatively, the processor 804 may be a different type of processor such as a parallel processor, or a field programmable gate array.

The computer system 800 is configured to utilize one or more data storage units. The computer system 800 may include a volatile memory unit 806 (e.g., random access memory ("RAM"), static RAM, dynamic RAM, etc.) coupled with the address/data bus 802, wherein a volatile memory unit 806 is configured to store information and instructions for the processor 804. The computer system 800 further may include a non-volatile memory unit 808 (e.g., read-only memory ("ROM"), programmable ROM ("PROM"), erasable programmable ROM ("EPROM"), electrically erasable programmable ROM "EEPROM"), flash memory, etc.) coupled with the address/data bus 802, wherein the non-volatile memory unit 808 is configured to store static information and instructions for the processor 804. Alternatively, the computer system 800 may execute instructions retrieved from an online data storage unit such as in "Cloud" computing. In an embodiment, the computer system 800 also may include one or more interfaces, such as an interface 810, coupled with the address/data bus 802. The one or more interfaces are configured to enable the computer system 800 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 800 may include an input device 812 coupled with the address/data bus 802, wherein the input device 812 is configured to communicate information and command selections to the processor 800. In accordance with one aspect, the input device 812 is an alphanumeric input device, such as a keyboard, that may include alphanumeric and/or function keys. Alternatively, the input device 812 may be an input device other than an alphanumeric input device. In one aspect, the computer system 800 may include a cursor control device 814 coupled with the address/data bus 802, wherein the cursor control device 814 is configured to communicate user input information and/or command selections to the processor 800. In one aspect, the cursor control device 814 is implemented using a device such as a mouse, a track-ball, a track-pad, an optical tracking device, or a touch screen. The foregoing notwithstanding, in one aspect, the cursor control device 814 is directed and/or activated via input from the input device 812, such as in response to the use of special keys and key sequence commands associated with the input device 812. In an alternative aspect, the cursor control device 814 is configured to be directed or guided by voice commands.

In one aspect, the computer system 800 further may include one or more optional computer usable data storage devices, such as a storage device 816, coupled with the address/data bus 802. The storage device 816 is configured to store information and/or computer executable instructions. In one aspect, the storage device 816 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 818 is coupled with the address/data bus 802, wherein the display device 818 is configured to display video and/or graphics. In one aspect, the display device 818 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 800 presented herein is an example computing environment in accordance with one aspect. However, the non-limiting example of the computer system 800 is not strictly limited to being a computer system. For example, one aspect provides that the computer system 800 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 9:
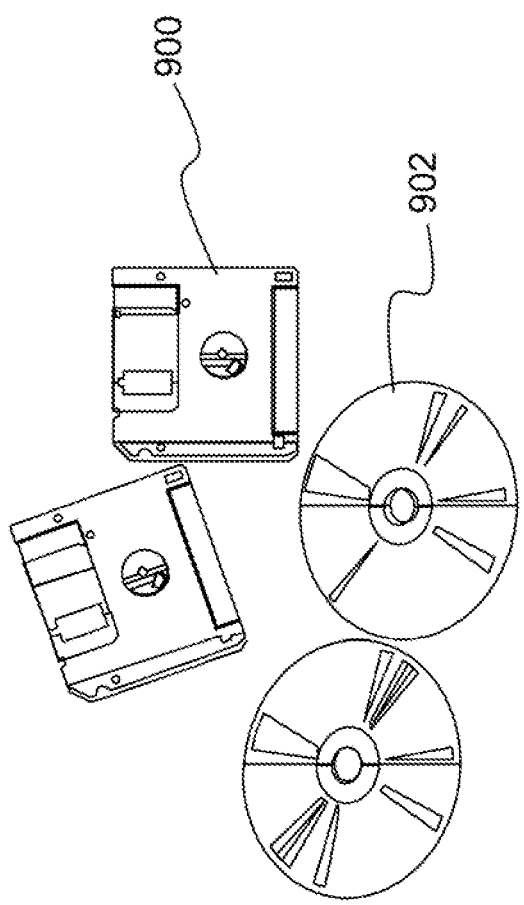
FIG. 9 is an illustration of a computer program product according to principles of the present invention.

An illustrative diagram of a computer program product embodying the present invention is depicted in FIG. 9. As a non-limiting example, the computer program product is depicted as either a floppy disk 900 or an optical disk 902. However, as mentioned previously, the computer program product generally represents computer readable code (i.e., instruction means or instructions) stored on any compatible non-transitory computer readable medium.

What is claimed is:

1. A system for explosive network attack mitigation, the system comprising:
   one or more processors and a non-transitory memory having instructions encoded thereon such that when the instructions are executed, the one or more processors perform operations of:
   receiving a network structure as input;
   selecting a network attack method that applies an Achlioptas process;
   selecting an explosive mitigation strategy;
   simulating an attack-mitigation competing process for the network structure;
   generating a sequence of network structures under competing processes; and
   quantifying effectiveness of the selected explosive mitigation strategy against the selected network attack method by analyzing the sequence of network structures under competing processes.

2. The system as set forth in claim 1, wherein the one or more processors further perform an operation of quantifying effectiveness of the selected mitigation strategy based on at least one measure that evaluates a change in size of a giant component in the sequence of network structures under competing processes.

3. The system as set forth in claim 2, wherein the at least one measure is a survival size measure that evaluates final sizes of the giant component following the attack-mitigation competing process.

4. The system as set forth in claim 2, wherein the at least one measure is an onset delay measure that evaluates a predefined fragmentation threshold of the size of the giant component.

5. A computer-implemented method for explosive network mitigation, comprising:
   an act of causing a data processor to execute instructions stored on a non-transitory memory such that upon execution, the data processor performs operations of:
   receiving a network structure as input;
   selecting a network attack method that applies an Achlioptas process;
   selecting an explosive mitigation strategy;
   simulating an attack-mitigation competing process for the network structure;
   generating a sequence of network structures under competing processes; and
   quantifying effectiveness of the selected explosive mitigation strategy against the selected network attack method by analyzing the sequence of network structures under competing processes.

6. The method as set forth in claim 5, wherein the data processor further performs an operation of quantifying effectiveness of the selected mitigation strategy based on at least one measure that evaluates a change in size of a giant component in the sequence of network structures under competing processes.

7. The method as set forth in claim 6, wherein the at least one measure is a survival size measure that evaluates final sizes of the giant component following the attack-mitigation competing process.

8. The method as set forth in claim 6, wherein the at least one measure is an onset delay measure that evaluates a predefined fragmentation threshold of the size of the giant component.

9. A computer program product for explosive network mitigation, the computer program product comprising computer-readable instructions stored on a non-transitory computer-readable medium that are executable by a computer having a processor for causing the processor to perform operations of:
   receiving a network structure as input;
   selecting a network attack method that applies an Achlioptas process;
   selecting an explosive mitigation strategy;
   simulating an attack-mitigation competing process for the network structure;
   generating a sequence of network structures under competing processes; and
   quantifying effectiveness of the selected explosive mitigation strategy against the selected network attack method by analyzing the sequence of network structures under competing processes.

10. The computer program product as set forth in claim 9, further comprising instructions for causing the processor to perform an operation of quantifying effectiveness of the selected mitigation strategy based on at least one measure that evaluates a change in size of a giant component in the sequence of network structures under competing processes.

11. The computer program product as set forth in claim 10, wherein the at least one measure is a survival size measure that evaluates final sizes of the giant component following the attack-mitigation competing process.

12. The computer program product as set forth in claim 10, wherein the at least one measure is an onset delay measure that evaluates a pre-defined fragmentation threshold of the size of the giant component.

* * * * *